April 12, 1949.                    M. K. EADES                    2,466,841
                       AUTOMATIC SHUT-OFF MECHANISM
                           FOR MILKING MACHINES
                           Filed Nov. 12, 1947
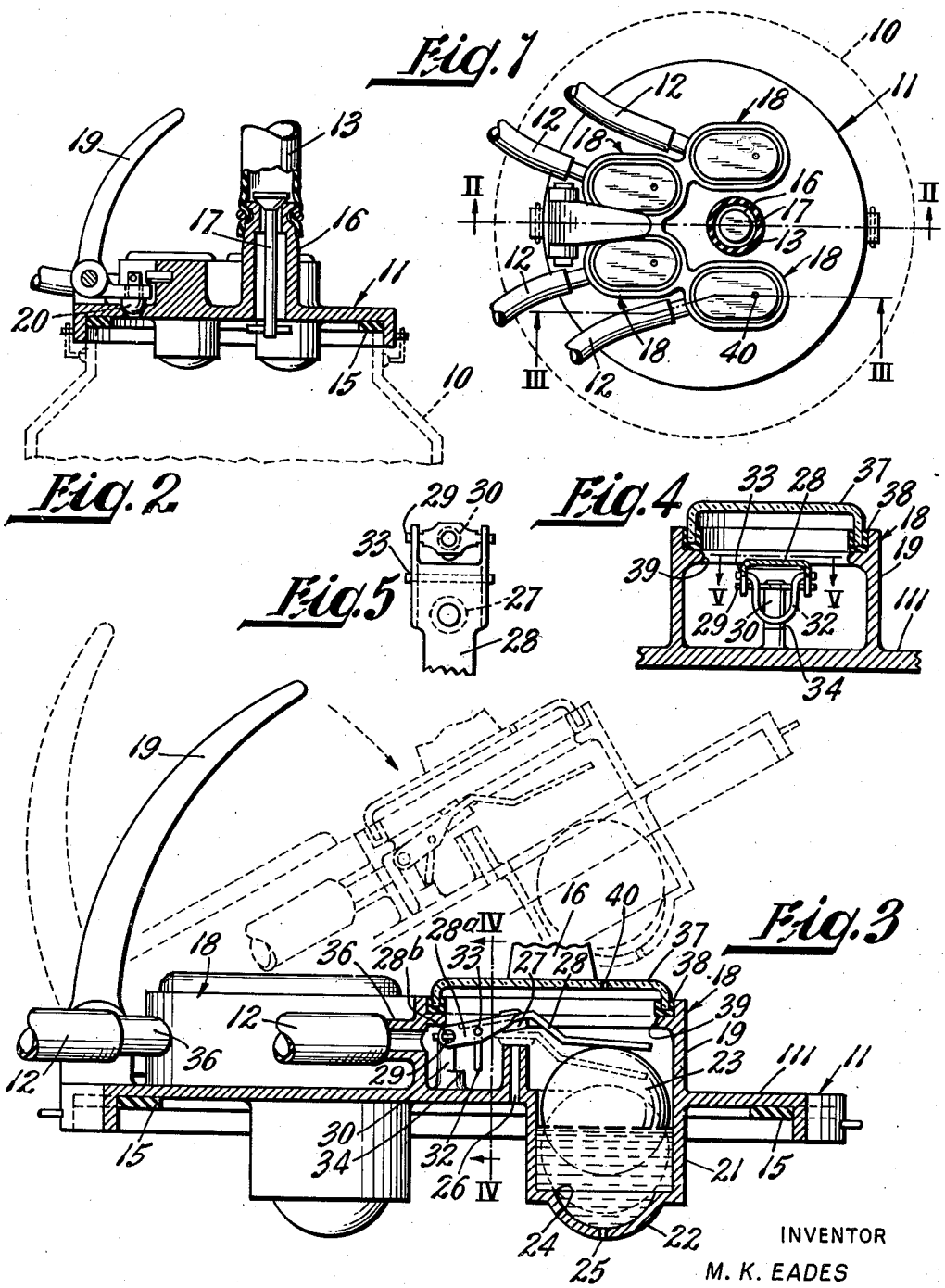
INVENTOR
M. K. EADES
BY
ATTORNEY.

Patented Apr. 12, 1949

2,466,841

UNITED STATES PATENT OFFICE 2,466,841

AUTOMATIC SHUTOFF MECHANISM FOR MILKING MACHINES

Marion K. Eades, Pasadena, Calif.

Application November 12, 1947, Serial No. 785,456

8 Claims. (Cl. 31—86)

1

This invention relates to milking machine mechanisms that will automatically stop the milking action when the milk flow ceases.

Such devices are not broadly new, because it has been recognized for many years that injury to cows can result from continuing the milking action after the milk supply is exhausted. However, to the best of my knowledge, the prior known mechanisms have been impracticable for one reason or another and are not being generally used today.

A broad object of the present invention is to provide a milking machine shut-off mechanism that is practicable.

A more specific object is to provide a milking machine shut-off-mechanism that is simple, inexpensive, easily cleaned and sterilized, and is particularly easy to manipulate.

The manner in which the foregoing objects, together with more specific objects and features of the invention, are realized will be understood from the following description with reference to the drawing, in which:

Fig. 1 is a plan view of a milking machine tank cover incorporating the invention;

Fig. 2 is a vertical section through the tank cover taken in the plane II—II of Fig. 1;

Fig. 3 is an enlarged vertical section taken through the tank cover in the plane III—III of Fig. 1;

Fig. 4 is a detail vertical section taken in the plane IV—IV of Fig. 3; and

Fig. 5 is a detail plan view taken in the plane V—V of Fig. 4.

In accordance with conventional practice, a milking machine includes a tank 10 having a cover 11 through which connections are made to hoses 12 leading to the teat cups and a hose 13 which leads to a pulsator or pump which provides the necessary suction to operate the teat cups. The milk withdrawn from the teat cups flows through the hoses 12 into the tank 10.

The cover 11 is secured to the tank 10 in any known manner, and air tight connection is usually effected by the use of a gasket 15 of rubber or like material. Also in accordance with existing practice, a nipple 16 is provided as a part of the cover 11 for making connection with the hose 13 that leads to the pulsator. A safety valve 17 is commonly provided in the nipple 16 to prevent a sudden rush of air through the hose 13 into the tank 10 in the event the pulsator end of the hose is disconnected from the pulsator while there is a vacuum in the tank 10. It is also conventional practice to provide a handle 19 on the cover 11

2 which handle actuates a valve 20 to break the vacuum in the tank and permit removal of the cover, by a rocking motion of the handle 19 counterclockwise (with reference to Fig. 2).

In accordance with the present invention, four valve casings are provided in the cover 11, one for each of the four hoses 12 extending to the teat cups. These four valve casings are indicated at 18 in Fig. 1. They are all of identical construction and will be described with reference to Figs. 3 and 4.

Each valve casing 18 is constituted by a side wall 19 which rises upwardly from the main wall 111 of the cover 11, and by a wall 21 which extends below the wall 111 and is closed by a bottom wall 22. The wall 19 is oval in horizontal section, as clearly appears from Fig. 1, whereas the lower wall 21 is cylindrical in shape. This cylindrical wall 21 defines the lower portion of a float chamber containing a float 23, which is preferably a hollow rubber ball adapted, when there is no liquid in the float chamber, to rest against and seal a circular edge 24 in the bottom wall 22. To this end, the center portion of the bottom wall 22 is shaped in the segment of a sphere of smaller diameter than the float 23. When the float 23 rests on the edge 24, it seals a bleeder hole 25 in the bottom wall 22.

The interior of the valve casing 18 is adapted to be communicated with the interior of the tank 10, not only through the bleeder hole 25, but through an outlet passage 26 the upper end of which is adapted to be closed by a valve 27. Thus the valve 27 may be of soft rubber and secured to a valve arm 28 which is pivoted at its left end on a crossbar 29 secured to the upper end of a post 30 which rises from the coverplate 111. As best shown in Fig. 4, the left end portion of the valve arm 28 is of channel cross section having downwardly depending flanges 28a in which pivot holes 28b are provided to receive the crossbar 29. Crossbar 29 may be formed of sheet metal riveted to the upper end of the post 30, and the outer ends of the crossbar may be of reduced width to extend into the holes 28b, the shoulders adjacent the reduced ends preventing lateral movement of the valve arm 28.

As shown in Fig. 3, the right end of the valve arm 28 extends across the float chamber in which the float 23 is positioned, and when the float is raised by the presence of milk in the float chamber the valve is held open (the position shown in Fig. 3.)

While the milking operation is proceeding, the float chamber contains milk which maintains the float 23 in upper position to hold the valve 27 open. However, it is necessary at the beginning of the milking operation to hold the valve 27 open by some other means until the float chamber has filled with milk. This means consists of a U-shaped wire latch member 32, the upper ends of which are extended outwardly into holes 33 in the flanges 28a of the valve arm 28. Ordinarily, the latch member 32 hangs straight downwardly as shown in Fig. 3. However, by swinging the lower end of the member 32 over onto a stop shoulder 34 formed in the post 30 the latch member can be caused to retain the valve 27 in open position even though there is no milk in the float chamber. Thereafter, when the float chamber fills with milk, and the float 23 rises against the valve arm 28, the lower end of the latch member 32 is carried clear of the shoulder 34, whereupon the member 32 swings into the vertical position, and, when the float chamber empties of milk at the end of the milking operation, the valve arm 28 is permitted to bring the valve 27 down against the valve seat at the upper end of the outlet passage 26, closing it off.

Each of the teat hoses 12 may be connected to the valve casing by a nipple 36 extending from the side wall 19. The upper end of each valve casing may be closed by a glass cover 37, which has secured to its edge a gasket 38 of rubber or the like, which in turn rests on an internal flange 39 of the side wall 19. A tiny pinhole vent 40 may be provided in the cover 37 to relieve the vacuum within the valve casing after the valve 27 has closed, and the float 23 has sealed off the bleeder hole 25. Breaking of the vacuum is necessary in order to eliminate the vacuum at the teat cups and permit the latter to fall clear of the teats.

The width of the valve casing 18 between the flange 39 on opposite sides of the valve casing is slightly less than the diameter of the rubber float 23, so that while the float can be forcibly inserted or removed it cannot accidentally fall out.

During the milking operation, the covers 37 are firmly retained in place by the vacuum within the valve casing. During handling operations the covers are held in place by friction of the gaskets 38 against the walls 19.

The device is operated as follows:

At the beginning of the milking operation, prior to attachment of the cover 11 to the tank 10, the cover is rocked counterclockwise from the position shown in Fig. 3 through an angle somewhat in excess of 90°. This causes the valve arms 28 in all four of the valve casings 18 to fall by gravity against the cover plates 37. At the same time, the latch members 32 fall by gravity over against their associated posts 30. The cover plate is then rocked back into normal position as shown in Fig. 3, and during this movement the latch members 32 all come to rest against the shoulders 34, to hold the valves 27 open. The dotted line showing in Fig. 3 shows the position of the valve during the return clockwise rocking motion from the valve-seating position.

The cover is then secured to the tank 10, and connection is made to the pulsator through the hose 13. The pulsator produces the usual vacuum within the tank, which is transmitted through the outlet passages 26 to the valve casings 18 and thence through the hoses 12 to the teat cups, causing the milk to flow. The milk enters the valve casings through the hoses 12 and flows into the float chambers, raising the floats 23 therein until they bear against the valve arms 28 and further elevate the latter to permit the latch members 32 to fall clear of the stop shoulders 33. However, the valves 27 remain open at this time because they are held up by the floats 23.

As the milk is exhausted from each teat, the flow of milk from that teat through the hose 12 into the valve casing 18 ceases, whereupon the milk level in the float chamber drops because of the constant drainage through the bleeder hole 25. The float 23 follows the liquid down, and closes the valve 27 stopping the application of suction through the outlet passage 26. However, suction is still applied through the bleeder hole 25 until the float 23 comes to rest against the circular edge 24, thereby sealing off the bleeder hole. This breaks all connection between the valve casing 18 and the tank 10, so that there is no longer any suction applied to the valve casing, and the existing vacuum is soon eliminated by entry of atmospheric air through the small pinhole bleeder hole. Thereupon, the milking action is terminated.

Although for the purpose of explaining the invention, a particular embodiment thereof has been shown and described, obvious modifications will occur to a person skilled in the art, and I do not desire to be limited to the exact details illustrated.

I claim:

1. An automatic valve mechanism for a milking machine having a tank, said mechanism comprising: a valve casing defining a float chamber and having a teat connection, an outlet passage to said tank, and a bleeder passage to said tank, said outlet passage having a valve seat in communication with its inner end; a valve and a pivoted valve arm in said casing supporting the valve for movement toward and away from said seat, a portion of said arm extending across said float chamber; and a float in said float chamber under said valve arm for lifting said arm to open said valve in response to milk in said chamber.

2. An automatic valve mechanism for a milking machine in accordance with claim 1 in which said bleeder passage is in the bottom of said float chamber, and said float is a hollow sphere of rubber-like material adapted to seal off said bleeder passage when said float is resting in the bottom of said float chamber.

3. An automatic valve mechanism for a milking machine in accordance with claim 2 in which the bottom of the float chamber is shaped to define a circular valve seat surrounding said bleeder passage and of lesser diameter than said float.

4. An automatic valve mechanism for a milking machine in accordance with claim 1 including a latch member pivotally secured to said valve arm whereby it depends vertically therefrom when unrestrained; and a stop for engaging the lower end of said latch member and holding said valve arm in open valve position, said stop being laterally displaced from the pivot point of said latch member whereby the latch swings clear of said stop in response to elevation of said valve arm by said float.

5. An automatic valve mechanism for a milking machine in accordance with claim 4 in which said valve arm is of inverted channel cross section having flanges thereon; said latch member comprises a U-shaped member having its upper ends extending laterally into pivot holes provided therefor in said flanges of said valve arm; a post having a crossbar at its upper end extending through pivot holes provided therefor in the flanges of said valve arm, said crossbar constituting the pivotal support for said arm; and said post having a shoulder thereon constituting said stop.

6. An automatic valve mechanism for a milking machine according to claim 1 in which said valve casing comprises a body member defining the bottom and side walls and having a flange projecting inwardly from the side walls adjacent the upper edges thereof, a transparent cover plate within said side walls and above said flange; and a gasket on the edge of said cover frictionally engaging said side walls and sealing with said flange.

7. An automatic valve mechanism for a milking machine in accordance with claim 6 in which said cover plate contains a pinhole for equalizing the pressure in said valve casing.

8. An automatic valve mechanism for a milking machine in accordance with claim 1 in which said valve casing comprises a body member defining the bottom and side walls and having a flange projecting inwardly from the side walls adjacent the upper edges thereof; and a cover plate seating against said flange; said float comprising a hollow sphere of rubber-like material of greater diameter than the width of the passage defined by said flange.

MARION K. EADES.

REFERENCES CITED

The following references are of record in the file of this patent:

UNITED STATES PATENTS

| Number | Name | Date |
|---|---|---|
| 1,276,803 | Poarmann | Aug. 27, 1918 |